R. D. & C. E. LOIKA.
PLOW.
APPLICATION FILED MAR. 21, 1912.
1,079,355.
Patented Nov. 25, 1913.
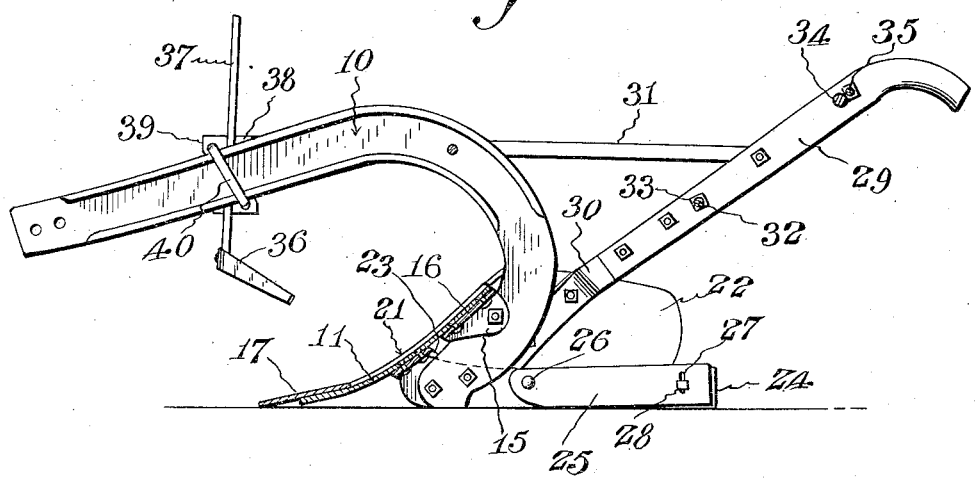
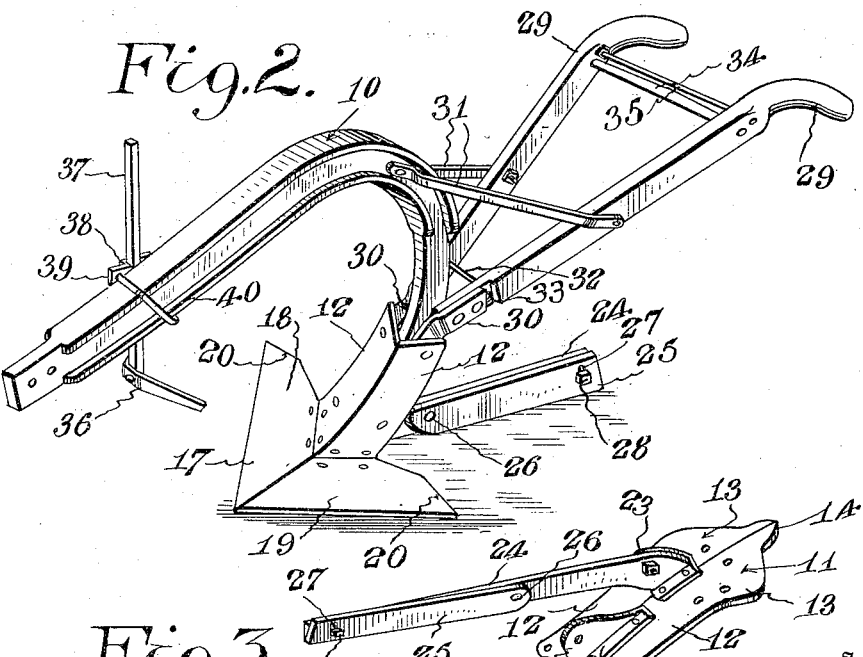
Inventors
R. D. Loika.
C. E. Loika.

UNITED STATES PATENT OFFICE.

RICHARD D. LOIKA AND CHARLES E. LOIKA, OF BALLINGER, TEXAS.

PLOW.

1,079,355.  Specification of Letters Patent.  Patented Nov. 25, 1913.

Application filed March 21, 1912. Serial No. 685,209.

*To all whom it may concern:*

Be it known that we, RICHARD D. LOIKA and CHARLES E. LOIKA, citizens of the United States, residing at Ballinger, in the county of Runnels, State of Texas, have invented certain new and useful Improvements in Plows; and we do hereby declare the following to be a full, clear, and exact description of the invention, such as will enable others skilled in the art to which it appertains to make and use the same.

This invention has particular reference to plows of the lister type.

Primarily, the object of this invention is to provide a novel and simple plow structure which permits of the detachment of the mold boards of the plow for making a low bed or for making a high bed especially when the grass and weeds in a field are considerably high.

Another and important object of the invention consists in rendering the parts of the plow readily attachable and detachable and in which the handles of the plow may be conveniently attached to the mold boards or to the frog when the wings are removed, the plow being of novel formation and having a stalk distributer attached to the beam thereof so as to push the stalks out of the way during the advance of the plow.

With the above and other objects in view, the invention consists in certain combinations and arrangements of parts to be hereinafter more fully described, claimed and illustrated in the accompanying drawing forming part of this application, in which:

Figure 1. is a longitudinal sectional view of the plow. Fig. 2. is a perspective view of the plow with the mold boards removed and the handles attached to the frog of the plow, for use in making low beds. Fig. 3. is an inverted perspective view of the frog and its beam attaching ear and also with the guide bars connected thereto.

Referring more specifically to the drawings in which like characters designate similar parts throughout the several views, the numeral 10 designates the beam of the plow which is preferably of metal, the same having its lower end or its curved rear end attached to an angular frog 11. This frog is formed preferably of cast metal and has its side portions 12 enlarged laterally rearwardly of their forward ends as shown at 13 and terminating in a tapered forward end portion 14 while the beam 10 is secured rearwardly of the frog 11 through the medium of an apertured ear or attaching bracket 15 which is provided with a flanged portion 16 which is secured to the inner face of the frog vertically of its angular portion and near its rear and upper edge.

A point 17 is mounted on the forward end of the frog 11 and has a pair of shares or share blades 18 and 19 extending rearwardly and outwardly to form an approximately V-shaped notch in the rear edge of the point along the edges of which, said point is removably attached to the side portions of the frog. Both of the wings 18 and 19 form a point of extreme width being 24 inches wide so as to produce a cut of 24 inches of ground to assist in its cutting operation and the rear edges of the shares are also beveled as shown at 20 to permit the proper distribution of the elevated soil during the advancement of the plow.

In addition to the point 17 and its shares 18, the mold-board of the plow is formed of opposite mold boards or double mold boards 21 having their inner edges meeting at the angular portion of the frog and bent in concaved form to conform to the curvature of the frog, while the lower ends of the mold boards 21 engage in the notch at the rear end of the point 17 and are secured along said ends to the frog in a similar manner as the plow point is secured thereto. The mold boards 21 each have their upper portions provided with outwardly and rearwardly extending portions or lateral extensions 22 which preferably have their rear ends rounded, these extensions serving to regulate the height of the bed formed by the plow. Also secured to the angular portion of the frog 11 beneath the attaching bracket 15 is an attaching bracket or plate 23 to which the lower rear end of the beam 10 is secured in connection with a horizontal rearwardly extending guide bar 24 adapted to engage the ground rearwardly of the plow point for guiding the same and determining the proper depth of the furrow. A supplemental bar 25 is pivoted adjacent its forward end as shown at 26 to the guide bar 24 and has a vertical slot 27 formed near its rear end for adjustment of the supplemental bar below or in alinement with the said guide bar by means of a clamping member 28 carried by the guide bar and engaged through the slot so as to further regulate the tipping of the point.

In Fig. 1 of the drawings the mold boards 21 are shown in position for use in making high beds where the grass and weeds are considerably high and thick and when thus used a pair of handles 29 have their forward ends secured to castings 30 which are in turn removably attached at their forward ends to the upper portions of the mold boards on a line contingent with the outer edges of the lower reduced portions of said mold boards. The handles are connected to the beam by braces 31 secured to the beam by a common fastening member and said handles are connected at their lower ends by a rod 32 threaded for a considerable portion of its length at each end and engaged through the handles with nuts 33 mounted on the threaded portions on each side of the handles for holding them from movement laterally on the rod. The handles are preferably formed of wood and near their upper ends are connected by a brace 34 above which a rod 35 is secured for holding the handles toward the brace while the latter limits the movement of the handles toward each other.

In Fig. 5 of the drawings the handles are shown as attached to the frog at its side portions instead of to the mold-boards and mold boards are removed for the use of the device in making a low bed. In order to assist in the operation and advancement of the plow a stalk distributer 36 is provided, the same comprising a V-shaped section of metal providing arms extending outwardly and rearwardly from a vertical standard 37 to the lower end of which it is secured, said standard having its upper end secured to the beam intermediate of its horizontal portion by a clamp plate 38 having a vertical groove receiving the standard for adjustment therein and having diagonally opposite apertured ears 39 through which a U-clip 40 is secured around the beam. The distributer operates to push the stalks out of the way of the plow during the advancement of the plow and in this way the point and guide bar will lie flat on the ground.

In the use of the plow a suitable clevis 41 is attached to the forward end of the beam for the securing of four or any other number of draft animals thereto and with the mold boards attached or removed, efficient work can be done cutting at a maximum depth if desired and removing all of the stalks. It will thus be seen that we have provided a very efficient plow structure and we wish to have it understood that such changes may be made in the detail structure of the device as fairly fall within the scope of the same as claimed.

We claim:—

In a plow of the class described, a frog, a bracket secured to said frog adjacent the lower portion thereof, a second bracket secured to said frog adjacent the upper portion thereof and displaced laterally with reference to the first bracket, a runner having its forward end positioned against the first bracket, a standard lying on one side of the first bracket and lying on the opposite side of the second bracket, a bolt passing through said first bracket, standard and runner, a second bolt passing through the second bracket and standard, and a third bolt passing through the runner and standard to the rear of the first bolt, said bolts lying in triangular relation.

In testimony whereof, we affix our signatures in presence of two witnesses.

RICHARD D. LOIKA.
CHARLES E. LOIKA.

Witnesses:
 JNO. I. GUION,
 A. J. ZAPPE.

---

Copies of this patent may be obtained for five cents each, by addressing the "Commissioner of Patents, Washington, D. C."